United States Patent Office 2,805,252
Patented Sept. 3, 1957

2,805,252

METHOD OF MAKING AROYL HALIDES FROM CUPRIC BENZOATES AND CARBON TETRA-HALIDES

Warren W. Kaeding, Concord, Calif., assignor to The Dow Chemical Company, Midland, Mich., a corporation of Delaware No Drawing. Application September 23, 1955, Serial No. 536,309

2 Claims. (Cl. 260—544)

This invention relates to a novel method for the production of benzoyl chloride or benzoyl bromide, or analogous compound, from cupric benzoate or from the cupric salt of an analog of benzoic acid.

According to the invention, an aroyl halide is produced when the cupric salt of benzoic acid, or of any alkyl- or alkoxy-substituted benzoic acid, is heated under pressure sufficient to maintain a liquid phase in the reaction vessel, at from 175° to 250° C. for 0.5 to 3 hours with an excess of carbon tetrachloride or tetrabromide. Significant amounts of benzoic acid are obtained, along with the benzoyl halide, whenever the cupric benzoate contains water of crystallization. There is also formed a minor amount of benzoic anhydride. No significant amounts of tars are produced.

In a specific example, 1 molar proportion of cupric benzoate, containing about 0.67 mol of combined water, was sealed in a glass-lined pressure vessel with about 18 molar proportions of carbon tetrachloride. The vessel was heated at 200° C. for 1 hour, and was then cooled to room temperature and finally chilled in solid carbon dioxide. The vessel was opened and both hydrogen chloride and carbon dioxide were identified, but not measured, in the released gases. The organic matter was extracted from the copper compound remaining in the vessel, by means of methylene chloride. Chlorine analysis of the copper compound showed it to be a mixture of cuprous and cupric chlorides. The extract was subjected to careful fractionation under anhydrous conditions, to remove compounds more volatile than benzoic acid. There was obtained 0.6 molar proportion of benzoyl chloride. The undistilled residue contained 1.15 molar proportions of benzoic acid and 0.03 molar proportion of benzoic anhydride.

When the cupric benzoate is essentially anhydrous, the proportion of benzoyl chloride is increased and the proportion of benzoic acid is proportionally decreased in the product. The basic reaction is

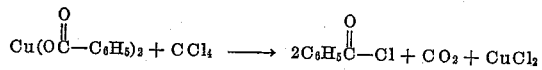

Under the conditions of the specific example given above, the equation approximates the following:

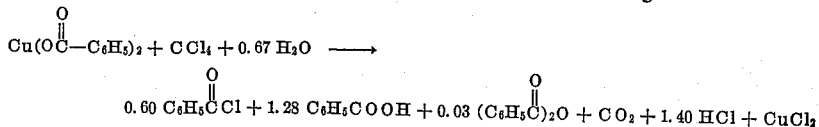

A similar reaction occurs, and benzoyl bromide is formed, when cupric benzoate is heated with carbon tetrabromide. The reaction temperatures are in the same range of 175° to 250° C. but the pressures are somewhat lower than when the chloride is used, because of the lower volatility of carbon tetrabromide.

It has been found qualitatively that cupric salts of alkylbenzoic acids and of alkoxybenzoic acids react in like manner with carbon tetrachloride or tetrabromide to give alkyl or alkoxybenzoyl halides. No limit has been found to the length of the alkyl group in alkylbenzoic and alkoxybenzoic acids useful in the process. The readily available members of these classes have from 1 to 18 carbon atoms in the alkyl or alkoxy substituent.

I claim:

1. The method which consists essentially in heating the cupric salt of an acid from the group consisting of benzoic acid, alkylbenzoic acids and alkoxybenzoic acids for from 0.5 to 3 hours with a molecular excess of a compound from the group consisting of carbon tetrachloride and carbon tetrabromide, at a temperature in the range from 175° to 250° C. and under sufficient pressure to maintain a significant proportion of the carbon tetrahalide in a liquid state, and thereafter recovering an aroyl halide from the reaction mixture.

2. The method claimed in claim 1, wherein the reagents are cupric benzoate and carbon tetrachloride and the aroyl halide produced is benzoyl chloride.

References Cited in the file of this patent

UNITED STATES PATENTS

| | | |
|---|---|---|
| 2,051,096 | Mares et al. | Aug. 18, 1936 |
| 2,700,679 | Carnahan et al. | Jan. 25, 1955 |
| 2,733,129 | Arnold | Jan. 31, 1956 |